Feb. 23, 1971    H. W. ANDERSEN ET AL    3,564,861
METHOD AND APPARATUS FOR CONTROLLING VOLATILE
MATERIAL SUPPLY AS A GAS
Filed Sept. 15, 1969    2 Sheets-Sheet 1
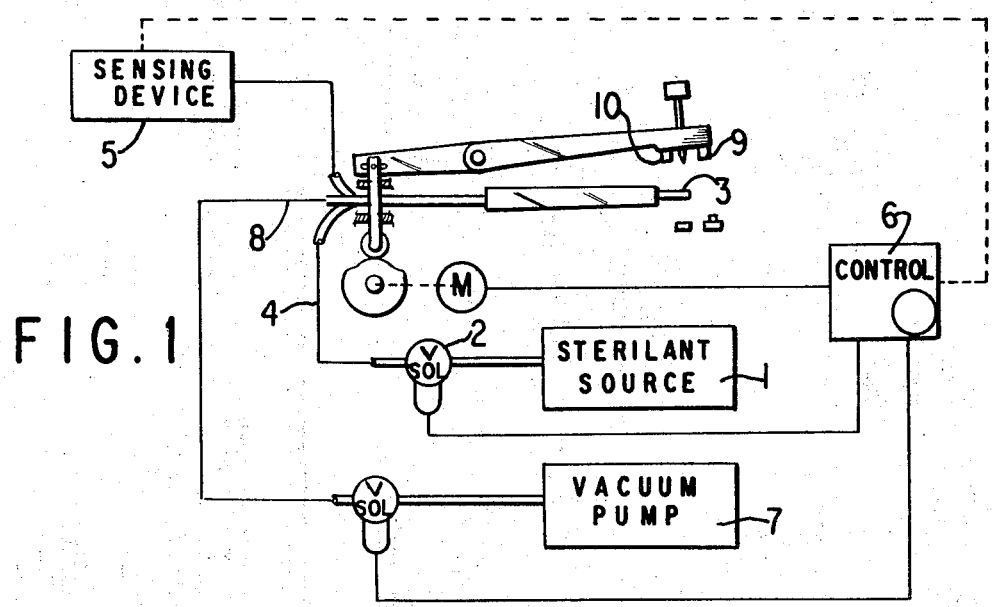
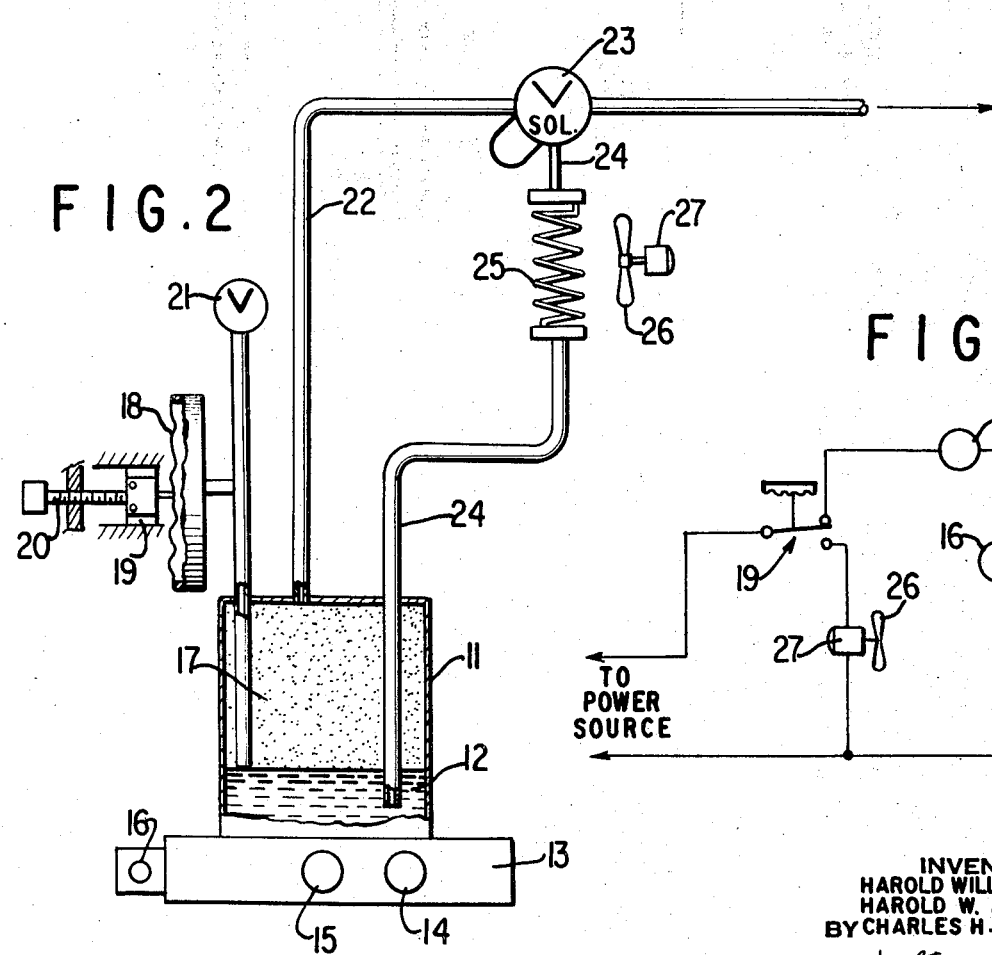
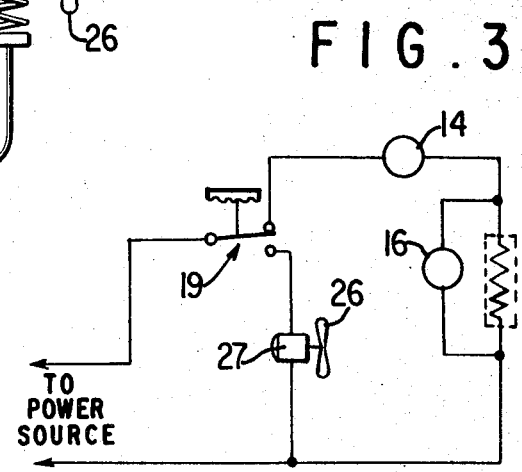
INVENTORS
HAROLD WILLIDS ANDERSEN
HAROLD W. ANDERSEN
BY CHARLES H. HARRISON
Nolte and Nolte
ATTORNEYS

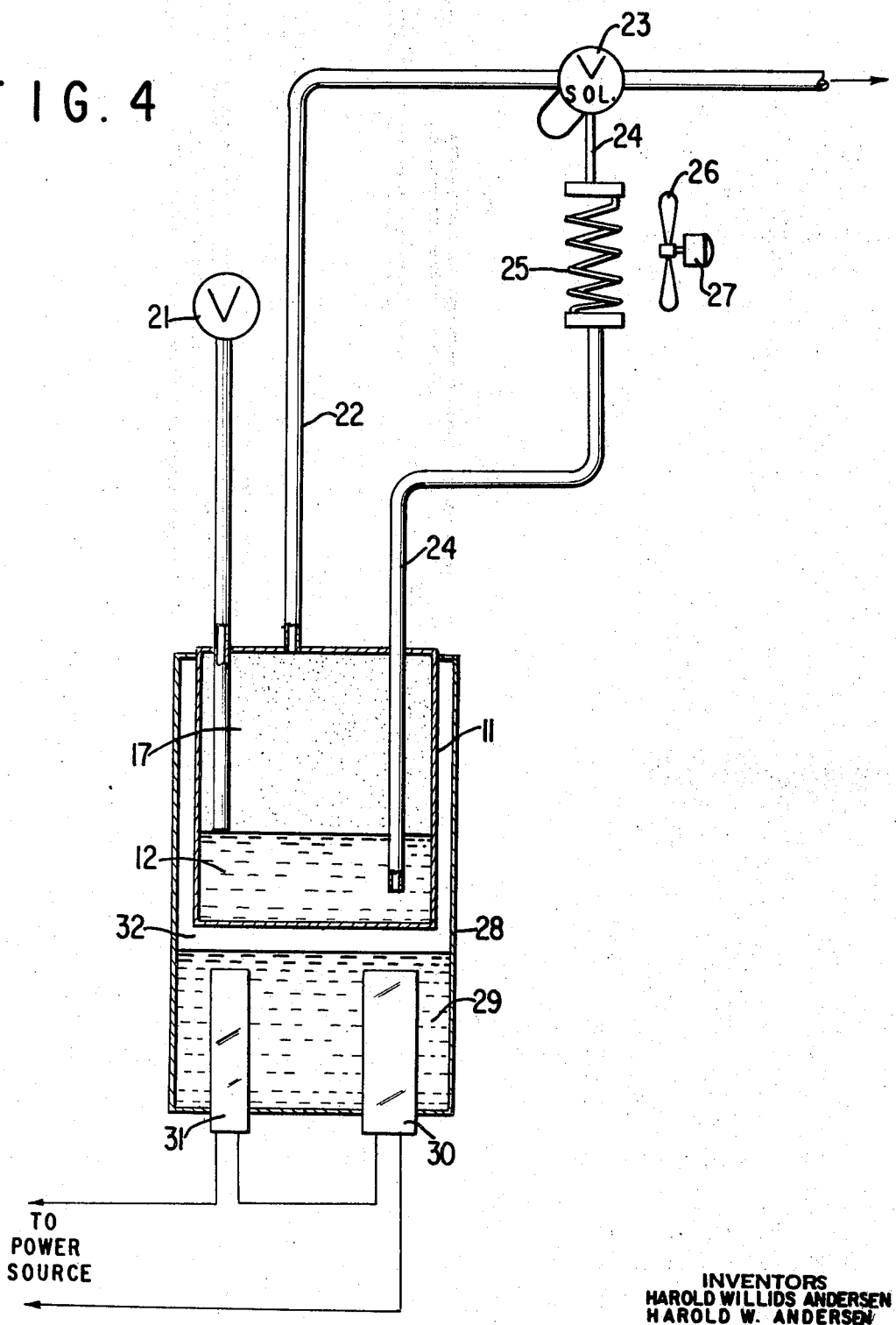

United States Patent Office 3,564,861
Patented Feb. 23, 1971

3,564,861
METHOD AND APPARATUS FOR CONTROLLING VOLATILE MATERIAL SUPPLY AS A GAS
Harold Willids Andersen, Oyster Bay, Harold W. Andersen, Laurel Hollow, and Charles H. Harrison, Oyster Bay Cove, N.Y., assignors to H. W. Andersen Products, Inc., Oyster Bay, N.Y., a corporation of New York
Continuation-in-part of application Ser. No. 561,777, June 30, 1966. This application Sept. 15, 1969, Ser. No. 857,802
Int. Cl. F17c 7/00
U.S. Cl. 62—50
8 Claims

ABSTRACT OF THE DISCLOSURE

The method and apparatus for controlling the delivery from a source of supply to a package or container of accurately measured quantities of volatile materials, supplied as liquids and delivered as gases, wherein the temperature and pressure of the materials are automatically stabilized close to the point of delivery as a function of heat exchange operations on the materials in their liquid phase.

---

This application is a continuation-in-part of copending application Ser. No. 561,777, now Pat. No. 3,516,223, granted June 23, 1970, being directed to specific improvements in the sterilant supply system applicable to the apparatus disclosed in said application as well as for other comparable purposes.

The measurement, packaging, and dividing into uniform doses of fluid materials having low boiling points present great difficulties, due largely to the unlimited expansibility of gases and the important interdependent effects of changes in temperature, pressure and volume. It is an object of the present invention to utilize such phenomena in obtaining extremely accurate control of a volatile substance, such as a sterilant, whereby it can be fed in accurately measured quantities to containers or packages wherein it can be sealed in order to effect sterilization of medical, surgical and other products, instruments tools, materials, apparatus and the like.

This invention relates specifically to methods of controlling the sterilant delivery to the packages sterilized on the machine disclosed in copending application Ser. No. 561,777, now Pat. No. 3,516,223. The problem is one of controlling the amount of the sterilant gas (ethylene oxide, or mixtures thereof, for example) delivered to each package which is processed through the system of said application. After each package, pouch or bag is placed over the torpedo or connecting means, the excess air is withdrawn from the bag by an external vacuum system. When the air is withdrawn, the vacuum system is disconnected, and a measured amount of sterilant is injected into the bag—the correct amount varying with the contents, the size of the bag, and other sterilization parameters.

One method of controlling the amount of sterilant gas admitted to the container being sterilized, is to accurately regulate the pressure of the delivered gas and vary the time it is permitted to flow into the container. Experience has shown, for example, that a gas delivery pressure of approximately 20 pounds per inch gage will permit accurate delivery to the container being sterilized with injection times of one to four seconds for typical products to be sterilized. It is readily apparent to one skilled in the art that increased delivery pressures would mean shorter delivery times, and vice versa, for the same amount of gas delivered.

The control of the gas delivery pressure can conveniently be separated into two groups. One group is concerned with sterilants, whose physical parameters are such that the delivery pressure, or the self pressure of the liquid/gas at room temperature is below the necessary or desired delivery pressure for which the system is designed. For example, ethylene oxide has a vapor pressure of of approximately 7 p.s.i.g. at room temperature. In order to raise the vapor-pressure to approximately 20 p.s.i.g., heat must be applied to the supply tank or container of the liquid/gas, to raise the temperature of the liquid to approximately 100° F. Each delivery of gas to a package withdraws the heat of evaporation of that amount of liquid evaporating within the sterilant supply container to supply the gas withdrawn. This heat must be replaced in order to maintain the temperature and thus pressure within the tank. The method of supplying and controlling the required heat is the subject of this application.

A second group of sterilants includes those which normally have a pressure in excess of the required delivery pressure when they are stored as a liquid; the management of such materials is dealt with in a contemporaneously filed application Ser. No. 857,803.

The rate at which the liquid sterilant is evaporated to gas is seldom constant because the number of machine cycles per minute or per hour will vary.

A simple thermostatically controlled heat source for the supply container is not suitable because of the large variation in temperature, and thus delivery pressure, caused by the thermal delay between sensing a requirement for heat, and the actual transfer of the heat to the liquid in the pressurized supply container. Conversely, when the thermostat detects that the temperature of the liquid is correct, the residual heat in the heater will cause an increase in supply tank temperature beyond that desired, and there will be an overshoot of pressure on the high side. This problem is negated according to this invention by supplying an amount of heat to the supply tank, marginally greater than that required for the greatest demands of the machine. A condensing system is then utilized to withdraw the excess heat from the system.

An important adjunct of the invention is an apparatus which is designed to achieve extremely rapid automatic regulation of the temperature of the material being handled, utilizing for this purpose, in one form, a novel heat exchange unit containing a liquid and the vapor thereof in constant equilibrium at their boiling point.

It is accordingly an object of the present invention to provide a method and apparatus for supplying sterilant gas to a sealing apparatus at a predetermined pressure.

It is a further object of the present invention to supply the sterilant gas to the sterilizing system substantially in the gaseous state whereby the parameters of sterilization can be controlled and damage to the product being sterilized can be avoided.

It is another object of the present invention to provide means whereby the desired delivery pressure of the sterilant gas to the sterilizing system can be maintained within a preselected pressure range.

In the accompanying drawings:

FIG. 1 is a schematic representation of the controls and other elements of an apparatus with which the present apparatus may suitably be associated, corresponding to FIG. 6 of application Ser. No. 561,777;

FIG. 2 represents somewhat diagrammatically, in elevation and partly in section, one form of the apparatus for handling low pressure materials;

FIG. 3 is a wiring diagram for the apparatus of FIG. 1; and

FIG. 4 represents, similarly to FIG. 2, an alternative form of apparatus for handling materials of the same type.

As indicated in FIG. 1, an article sterilizing system may include a sterilant source 1, a valve 2 controlling the release of sterilant therefrom, a torpedo 3 designed for introduction into a receptacle (not shown) for articles to be sterilized, a conduit 4 from valve 2 to torpedo 3 and adjustable automatic sensing and control devices 5, 6, with or without receptacle evacuating means 7, 8 and closing and sealing means 9, 10, all as more fully described in said copending application.

Referring to FIG. 2, a pressure tight supply container 11, containing liquid sterilant (ETO) 12, is supplied with a constant amount of heat from thermostatically controlled heat block 13 which supplies marginally more heat than the system requires. The temperature of the heat block 13 is maintained at a safe temperature by thermostat 14 which controls heater 15. Indicator 16 shows when the heater is supplying heat to the block 13. The sterilant in the supply container 11 exists as both a liquid 12 and as a gas, shown generally as 17. The gas occupies all of the space within the supply container and its appurtenances, above the liquid interface. Connected to the supply container is a sensitive movable pressure sensing diaphragm 18 which activates a sensitive single pole, double throw electrical switch 19 (typically a snap action "Micro-switch" type) which is mounted on a bracket whose position is adjustable by screw 20. The supply container also communicates with a valve 21 which may be used to control the replenishment of the liquid sterilant from an external supply (not shown) under pressure to the interior of the supply container. A tube 22 supplies the sterilant gas, under pressure, to the delivery valve shown generally at 23 (valve 2 in FIG. 1). This valve may conveniently be a solenoid operated valve of the two way type which delivers gas through the torpedo 3 (FIG. 1) to a receptacle (not shown) containing articles to be sterilized when it is opened. Because the sterilant vapor or gas is at a higher temperature than the surrounding room temperature, any surface which is not heated will tend to condense the gas back to the liquid state. This condensation will tend to heat the exposed surface to the temperature of the sterilant gas. The condensation in the area of the delivery valve 23 tends to cause liquid sterilant to be entrained as droplets in the gas delivered to the article or product to be sterilized. This liquid carry-over is undesirable as it alters the parameters of sterilization and may cause damage to said article or product being sterilized. The delivery valve 23 is designed to avoid this difficulty by special construction which assures that any accumulation of condensate in the valve is trapped and immediately returned to the supply container through the return tube generally indicated as 24.

The valve 23 may conveniently be a simple solenoid valve installed in an inverted position with a drain hole drilled through the bottom on the high pressure side, to which the return tube 24 is connected. Condensation normally occurs only on the high pressure side, since the pressure drop across the valve is not sufficient to cool the sterilant gas below its condensing point.

In order to remove the excess heat deliberately supplied to the container 11 by the heat block 13, a condenser 25, having large surface area, is connected in return line 24. A fan 26 driven by a motor 27 is mounted so that its air stream is directed across the condenser 25. The return tube 24 extends into the supply container and terminates under the surface of the liquid sterilant 12. This arrangement causes a continuous flow of the gaseous sterilant through tube 22, past the delivery valve 23, through return tube 24 to the condenser 25 where the gaseous sterilant is condensed to liquid and flows back to the supply container. The fan 26 and motor 27 is controlled by the sensitive snap action switch 19 and diaphragm 18 such that it turns on and forces cool air over the condenser whenever the pressure in the supply container exceeds the set point. The snap action switch 19 also disconnects the power to the heater 15 while the fan is running. When the pressure in the system is reduced below the set point of the switch 19, the fan is turned off, and the heater is reenergized. The thermal relay of the heater is relatively long, too long to be of use, as described above. However, the thermal delay of the condenser is quite short. By using a very sensitive diaphragm pressure sensing device, the delivery pressure can be controlled well within acceptable limits. For example, this system will control the delivery pressure of pure ethylene oxide sterilant within ±1 p.s.i.g., under extreme conditions, and within ±¼ p.s.i.g. under typical use conditions.

The use of the short thermal delay characteristics of the fan cooled condenser is an important feature of this method. Further, the use of the circulating warmed sterilant gas in the delivery tubing, past the specially constructed delivery valve to the condenser and return to the sterilant supply container eliminates the need for supplying external heat to the delivery tubing to prevent condensation and the carryover of droplets of sterilant in the delivered gas.

FIG. 4 shows the same delivery system as FIG. 2, modified by the addition of an external jacket 28 which contains water 29. The space above the water, shown generally as 32, has previously been evacuated of all the air, and now contains only water vapor. The outer jacket 28 is fitted with wells which contain a suitable heating element 30 and a sensisitive thermostat 31. Sensitive diaphragm 18 and its associated parts shown in FIG. 2 have been omitted in FIG. 4 as they are not needed in this modification.

The water 29 in the jacket is heated to the desired temperature, i.e., 100° F. The 100° F. water vapor in space 32 will condense on the cooler surface of the sterilant container 11 releasing the heat of condensation thereby raising the temperature of the sterilant 12 and its vapor shown generally as 17, in much the same fashion as the heater block 13 of FIG. 2. The temperature of the water 29 is readily maintained within 1° F. of the desired temperature by commercially available thermostats 31. Eventually an equilibrium will be reached wherein the water vapor condensing on the surface of sterilant container 11 will maintain the entire delivery system at equilibrium temperature of 100° F., thus the vapor pressure of the ethylene oxide sterilant 17 will be 20 p.s.i.g. as desired.

Each delivery of gas to the utilization system by means of the valve 23 withdraws the heat of evaporation of that amount of liquid sterilant evaporating within the sterilant supply container 11 to supply the gas withdrawn. This heat is replaced by the condensing water vapor on the outside of the sterilant container 11, and by the reserve heat in the water system. For example, a typical gas withdrawal of the system of application Ser. No. 561,777 might be 0.1 gram. The heat of vaporization of ethylene oxide is 136 calories per gram, thus 13.6 calories must be exchanged from the water system into the sterilant system, requiring the condensation of only .0238 gram of water. The specific heat of water is one calorie per gram per ° C. As the water jacket will contain approximately 2200 grams of water, this causes a reduction of temperature of only .011° F. in the water jacket system. It can thus be seen that there is a large reserve heat capacity in the water jacket system, which, because it is immediately available as the heat of condensation of the water vapor, provides the extremely short thermal delay capability necessary to control temperature and thus the delivery pressure of the sterilant extremely closely.

What is claimed is:

1. Apparatus for increasing and maintaining the pressure of a confined volatile fluid to and within a predetermined pressure range and for feeding measured doses of the confined fluid as a gas to a utilization point including means for containing said fluid, means for adding heat to said fluid as a liquid, means for removing excess heat from said fluid as a gas to stabilize said gas at a desired temperature, means for feeding said gas to said utilization point, said feeding means being in communication with a lower temperatured environment whereby a portion of said gas is condensed and means for removing at least a portion of said condensate from said feeding means and returning said condensate to said container means.

2. An apparatus according to claim 1 wherein said heat removing means includes a condenser and fan means for circulating cool air therepast.

3. An apparatus according to claim 1 which includes pressure responsive actuating means, said actuating means being arranged to actuate said heat adding and heat removing means alternatively.

4. An apparatus according to claim 2 in which the feeding means includes a solenoid valve and which includes a by-pass connecting the up-stream side of said valve to said condenser.

5. An apparatus according to claim 1 in which the means for adding heat includes an evacuated water jacket containing water antd water vapor in a position to supply heat of condensation to the fluid containing means, a heater for supplying heat to said water and control means for actuating said heater to maintain the water temperature within a desired range.

6. The method of supplying measured quantities of gas to a point of utilization which includes, providing a quantity of volatile liquid under low pressure and having an interface with a quantity of the gaseous phase of the same liquid, supplying heat to said liquid to raise the pressure of said gas, condensing a portion of the gas to remove excess heat therefrom, delivering measured quantities of said gas to a point of utilization, and controlling the rate of heat supply and rate of condensation to maintain the pressure of the gas within a desired range at the point of delivery.

7. The method according to claim 6 in which the rates of heat supply and condensation are controlled as a function of variations in the gas pressure.

8. The method according to claim 6 in which the rates of heat supply and condensation are controlled as a function of variations in the liquid temperature.

References Cited

UNITED STATES PATENTS

| | | | |
|---|---|---|---|
| 3,092,974 | 6/1963 | Haumann et al. | 62—50X |
| 3,272,258 | 9/1966 | Bourquard | 165—105X |
| 3,361,517 | 1/1968 | Skaller | 21—91X |

ALBERT W. DAVIS, JR., Primary Examiner

U.S. Cl. X.R.

21—58, 91, 108; 62—54; 165—27, 66